United States Patent [19]

Schoening et al.

[11] Patent Number: 4,842,810
[45] Date of Patent: Jun. 27, 1989

[54] NUCLEAR POWER PLANT WITH A HIGH TEMPERATURE REACTOR LOCATED ECCENTRICALLY IN A CYLINDRICAL PRESTRESSED CONCRETE PRESSURE VESSEL

[75] Inventors: Josef Schoening, Hambruecken; Winfried Wachholz, Gorxheimertal; Ulrich Weicht, Weinheim, all of Fed. Rep. of Germany

[73] Assignee: Hochtemperatur-Reaktorbau GmbH, Fed. Rep. of Germany

[21] Appl. No.: 131,724

[22] Filed: Dec. 11, 1987

Related U.S. Application Data

[63] Continuation-in-part of Ser. No. 66,464, Jun. 26, 1987, Pat. No. 4,761,260.

[30] Foreign Application Priority Data

Dec. 12, 1986 [DE] Fed. Rep. of Germany ....... 3642542

[51] Int. Cl.[4] .................. G21C 1/32; G21C 15/12; G21C 15/18
[52] U.S. Cl. ..................................... 376/299; 376/296
[58] Field of Search ................. 376/289, 296, 299, 381

[56] References Cited

U.S. PATENT DOCUMENTS

| | | | |
|---|---|---|---|
| 4,657,732 | 4/1987 | Schöning et al. | 376/381 |
| 4,661,313 | 4/1987 | Schöning et al. | 376/296 |
| 4,689,194 | 8/1987 | Wachholz et al. | 376/299 |
| 4,701,298 | 10/1987 | Schöning et al. | 376/296 |
| 4,713,211 | 12/1987 | Wachholz et al. | 376/299 |
| 4,743,424 | 5/1988 | Elter et al. | 376/381 |
| 4,752,439 | 6/1988 | Elter et al. | 376/299 |
| 4,756,872 | 7/1988 | Schöning et al. | 376/299 |
| 4,759,901 | 7/1988 | Wachholz et al. | 376/299 |
| 4,761,260 | 8/1988 | Schmitt et al. | 376/299 |

FOREIGN PATENT DOCUMENTS 3435255 9/1984 Fed. Rep. of Germany .
3534423 9/1985 Fed. Rep. of Germany .

Primary Examiner—Deborah L. Kyle
Assistant Examiner—Richard W. Wendtland
Attorney, Agent, or Firm—Robert J. Koch

[57] ABSTRACT

A nuclear power plant with a high temperature reactor located eccentrically in a prestressed concrete pressure vessel with spherical fuel elements for a capacity of 100-300 MWth intended primarily for power generation. The plant is inherently safe even in extreme accidents due to special devices for removal of decay heat. It is provided that upon a failure of the operational decay heat removal devices, decay heat is removed through a liner cooling system of the prestressed concrete pressure vessel. The liner cooling system is connected to a water-filled elevated reservoir by an external circulation loop. The elevated reservoir is connected to a further heat sink through a recooling circulation loop. It is possible to feed water into the elevated reservoir.

8 Claims, 1 Drawing Sheet

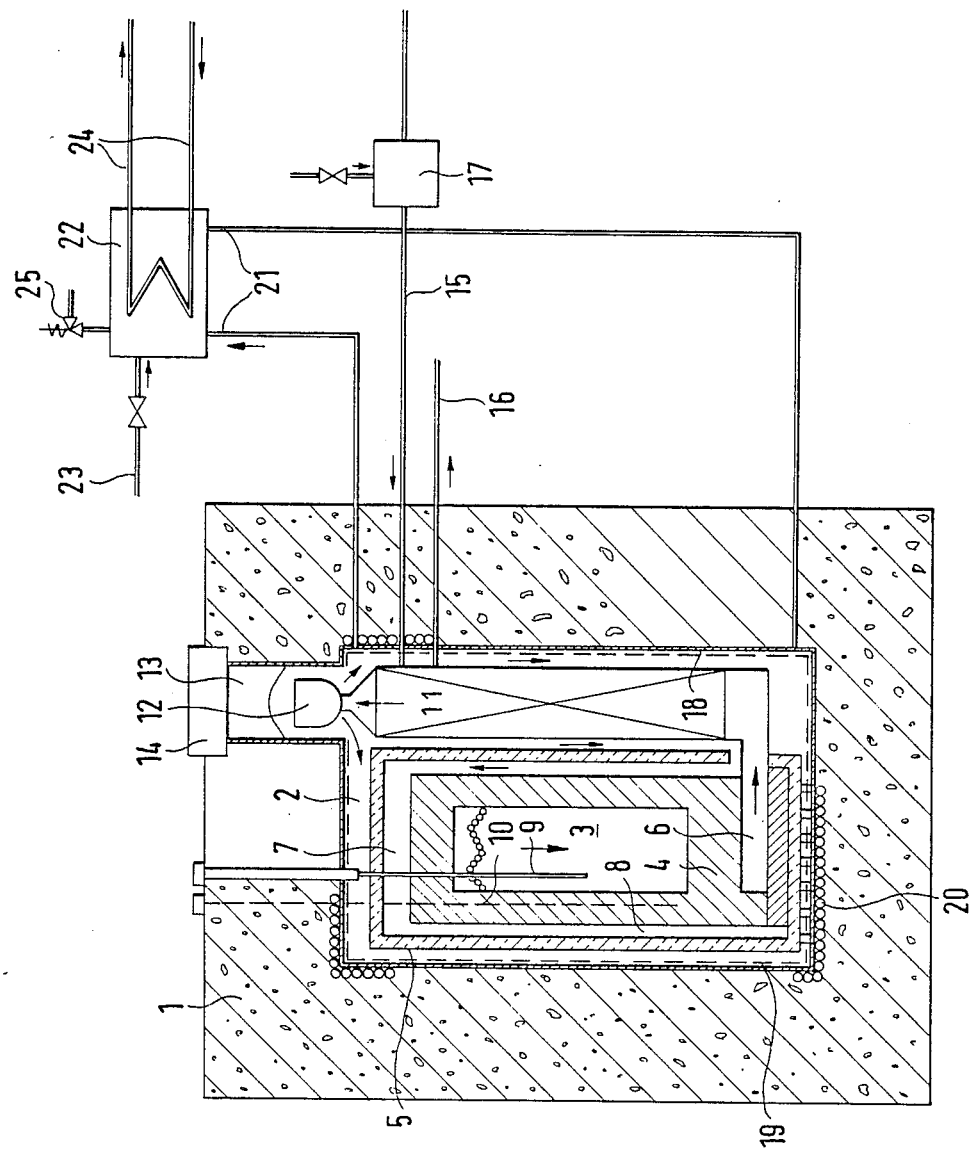

NUCLEAR POWER PLANT WITH A HIGH TEMPERATURE REACTOR LOCATED ECCENTRICALLY IN A CYLINDRICAL PRESTRESSED CONCRETE PRESSURE VESSEL

This is a continuation-in-part of U.S. application Se. No. 066,464 now U.S. Pat. No. 4,761,260.

BACKGROUND OF THE INVENTION

1. Field of the Invention

The invention relates to a nuclear power plant and, more particularly, to a plant with a cylindrical prestressed concrete pressure vessel containing an eccentrically arranged reactor. The pressure vessel cavity is clad with a liner. The reactor is a helium cooled high temperature reactor with a pile of spherical fuel elements arranged in its core. A graphite reflector surrounds the pellet pile on all sides and a plurality of absorber rods are insertable into the lateral portion of the graphite reflector. A cold gas collector chamber is located above the hight temperature reactor; at least two parallel heat exchangers are arranged in the cavity and the same number of circulating blowers follow the heat exchangers. The heat exchangers are installed adjacent to the high temperature reactor in the cavity and upwardly offset from the reactor. The heat exchangers are intended for operational heat removal and discharge of decay heat. A liner cooling system may also be used for the removal of decay heat.

2. Description of the Related Technology

West German Application DE P No. 36 21 516.3 corresponding to U.S. application Ser. No. 066,464 incorporated by reference herein shows a nuclear power plant with a power rating of 50-300 MWth. Heat is removed by several intermediate circulating loops and is used to supply a remote heating system. Each intermediate circulating loop comprises an intermediate heat exchanger and a circulating pump. An auxiliary loop is installed parallel to each intermediate circulating loop. The auxiliary loop is shut off in normal operation and contains a recooling system. The plant exhibits an elevated reservoir filled with water and connected to a further heat sink. The auxiliary circulating loops and the recooling system serve to remove the decay heat in the case of an accident.

West German Application DE P No. 35 34 423.7 shows a nuclear reactor plant with a small high temperature reactor. It proposes to connect the liner cooling system of the prestressed concrete pressure vessel housing the small high temperature reactor to an elevated reservoir filled with water under atmospheric pressure so that the liner cooling system may be operated by natural circulation.

West German Application DE-OS No. 34 35 255 shows a nuclear power plant with a small high temperature reactor installed in a steel pressure vessel. The removal of the decay heat is effected by special decay heat exchangers connected on the cooling water side to an external, geographically elevated recooling heat exchanger.

SUMMARY OF THE INVENTION

It is an object of the invention to provide a nuclear power plant with an output capacity of 100-500 MWth and primarily for power generation, in which case the possibility of the release of radioactivity is excluded even in the case of extremely severe accidents. The plant with a cylindrical prestressed concrete pressure vessel defining a liner clad cavity. A high temperature reactor is located eccentrically in the cavity exhibiting a core with a pile of spherical fuel elements. Helium coolant flows downward through the core and a graphite reflector surrounds the pellet pile on all sides. A plurality of absorber rods are insertable into the pile and into the lateral graphite reflector. A cold gas collector chamber is located above the high temperature reactor. At least two parallel heat exchangers are located in the cavity with corresponding circulating blowers following the heat exchangers. The heat exchangers are installed adjacent to the high temperature reactor in the cavity and offset upwardly from the high temperature reactor. The heat exchangers are intended simultaneously for the operational removal of heat and removal of decay heat. A liner cooling system may be used for the removal of decay heat. The nuclear power plant should be economically manufactured and operated.

The secondary side of each heat exchanger is connected to a water-stream loop for power generation. Advantageously, a cold gas chamber has a thermal capacity for hot gas temperatures and the liner cooling system and thermal insulation applied on the inside to the prestressed concrete pressure vessel may be arranged for removal of decay heat at an elevated temperature level. The liner cooling system may be connected to an elevated reservoir filled with water through an external cooling loop. The reservoir may further be connected to an additional heat sink by a recooling circulating loop. A device may be provided for supplying cooling water through the external loop to the liner cooling system.

The proposed nuclear power plant provides a passively safe high temperature reactor utilizing natural convection in combination with a liner cooling system as installations for removal of decay heat. Evacuation and relocation of the population living in the vicinity of the plant may be avoided. An accident of this type may occur if the heat exchangers or the circulating blowers fail. Decay heat may be removed by the liner cooling system alone by natural convection while the reactor is under pressure. The removal of decay heat may be continued for several days by evaporation of the water supply contained in the connected elevated reservoir. Further, additional water may be fed into the elevated reservoir and thus into the liner cooling system. If, in the course of an accident, the cooling medium is also lost, decay heat is conveyed to the liner cooling system by conduction and radiation.

The plant and pressure vessel are designed with sufficient integrity so that radioactivity remains safely contained in the prestressed concrete pressure vessel upon failure of the decay heat removal systems even in hypothetical accidents.

An advantage of the invention is that there is no risk of loss of capital in the case of the nuclear power plant according to the invention.

A further advantage resides in the use of a prestressed concrete pressure vessel in place of the steel pressure customarily provided in plants of this capacity. The nuclear power plant of the invention is of interest particularly for countries which are not capable of manufacturing large steel vessels or transporting them over long distances. Furthermore, numerous structural parts known from the THTR-300 may be used in such a nuclear power plant, so as to minimize expenditures for new developments.

The circulating blowers may be vertically installed above their associate heat exchanger in a passage in the prestressed concrete pressure vessel. Each heat exchanger may advantageously be equipped with an external device provided for the introduction of feed water. The configuration and prestressing system of the prestressed concrete pressure vessel are such that the pressure vessel passage closures are not unduly stressed. Advantageously, the installation of thermal insulation is optimized for minimal heat transfer during power operation and optimum heat transfer during the removal of decay heat. The capacity of the nuclear power plant may be increased by multiplication or addition of heat exchanger/blower units alone, while maintaining the same basic configuration. Further, advantageous features of the invention will become apparent from the description below of an embodiment with reference to the schematic drawing.

BRIEF DESCRIPTION OF THE DRAWING

The FIGURE shows a vertical section through a nuclear power plant according to the invention.

DETAILED DESCRIPTION OF THE PREFERRED EMBODIMENT

The FIGURE shows a high temperature reactor 3 eccentrically installed in the cavity 2 of a prestressed concrete pressure vessel. The core exhibits a pile of spherical fuel elements. Helium coolant flows downward through the pile. The pile is surrounded on all sides by a graphite reflector 4. The reflector is enclosed by a spaced thermal shield 5.

A hot gas collector chamber 6 is located under the bottom reflector. A cold gas chamber 7 is located between the roof reflector and the upper thermal shield. The cold gas chamber 7 is adapted to withstand elevated temperatures (500°–600° C.) in order to enable operation of the decay heat removal system in certain cases upon reversal of coolant flow direction. The cold, compressed helium passes through orifices in the thermal shield 5 to an annular space 8 defined by the shield and the lateral graphite reflector 4, in which it flows upward into the cold gas chamber 7.

Two different systems are provided for control and shutdowns of the high temperature reactor 3. First, a plurality of core rods 9 are insertable directly into the pile of fuel elements. The core rods are provided for long term shutdowns (with a cold, subcritical core). Normally, they remain in an extreme retracted position. The second system is used for control and rapid shutdown. It comprises the reflector rods 10, i.e., absorber rods displaceable in bores of the lateral graphite reflector 4. They are also used, to the extent possible, for long term shutdowns.

At least two heat exchangers 11 (only one is shown) are located in the cavity 2 and arranged in the helium circulation loop. They are operated with down evaporation. Each heat exchanger 11 is followed in the coolant flow direction by a circulating blower 12, installed in a vertical position in a passage 13 provided in the prestressed concrete pressure vessel. All passages 13 are equipped with vessel closures 14.

The secondary side of each heat exchanger 11 is connected to a steam circulation loop for power generation. Only the feed water line 15 and the live steam line 16 of the heat exchanger are shown. The feed water line 15 comprises a device 17 for the resupply of water. Each heat exchanger 11 is simultaneously intended for operational heat removal and for the removal of decay heat. In order to utilize natural convection, the heat exchangers 11 are installed parallel to the high temperature reactor 3 and upwardly offset relative to said high temperature reactor 3.

The cavity 2 of the prestressed concrete pressure vessel 1 is lined with a metal liner 18, to which a thermal insulation 19 is applied. A cooling system 20 exhibiting a plurality of tubes is welded to the liner 18 and embedded in the concrete of the vessel. The cooling system is connected by an external loop 21 to an elevated water-filled reservoir 22. Water may be supplied to the external loop 21 and thus to the liner cooling system 20 with the aid of a refill device 23.

The elevated reservoir 22 is connected to a further heat sink (not shown) by a recooling circulating loop 24. The reservoir 22 is also equipped with a drain valve 25.

The flow of the cooling gas in normal operation has been described above. The coolant flows downward through the core, upwards through the heat exchanger 11 to the circulating blower 12. This direction of the flow is also maintained during the normal decay heat removal, i.e., when the heat exchangers 11 and the circulating blowers 12 are available. As at least two heat exchangers 11 are provided, availability is adequate. The decay heat is safely removed both with the reactor under pressure and without pressure.

If the circulating blowers 12 fail, the decay heat is removed by natural convection, i.e., with flow reversal with the reactor under pressure to the heat exchangers 11. If the heat exchangers 11 are not available, decay heat is removed with the reactor under pressure, by natural convection through the liner cooling system 20, which is laid out accordingly. The water supply present in the elevated reservoir connected is sufficient to maintain decay heat removal for several days.

If the circulating blowers 12 and/or the heat exchangers 11 fail when the reactor is not under pressure, the decay heat is tranferred, as discussed above, by conduction and radiation to the liner cooling system 20.

We claim:

1. A nuclear power plant comprising:
   a cylindrical prestressed concrete pressure vessel defining a cavity exhibiting a liner;
   a high temperature reactor arranged eccentrically in said cavity;
   a pile of spherical fuel elements arranged in a core of said reactor;
   said reactor including a graphite reflector surrounding and defining said core, and means for inserting a plurality of absorber rods into a lateral portion of said reflector and into said core;
   a cold gas collector chamber located above said high temperature reactor configured to withstand hot gas temperature levels;
   thermal insulation and liner cooling means for removal of decay heat at an elevated temperature arranged on an inside surface of said pressure vessel;
   at least two heat exchangers arranged in parallel, and adjacent to said reactor and elevated with respect to said core wherein said heat exchangers are arranged for removal of operational and decay heat;
   a blower associated with each heat exchanger arranged in a coolant flow path subsequent to said heat exchanger and configured for downward coolant flow through said pile;

a power generation water-steam loop connected to a secondary side of each heat exchanger.

2. A nuclear power plant according to claim 1, wherein each blower is installed vertically above an associated heat exchanger in a passage in said prestressed concrete pressure vessel.

3. A nuclear power plant according to claim 1, further comprising means for introduction of feed water connected to each heat exchanger located outside said pressure vessel.

4. A nuclear power plant accordng to claim 2, further comprising passage closures located in said passages in said pressure vessel and wherein the prestressed concrete pressure vessel exhibits a configuration and prestressing system arranged to avoid imparting undue stresses on said closures.

5. A nuclear power plant according to claim 1, wherein said thermal insulation is optimized for minimal heat transfer during power operation and optimum heat transfer during the removal of decay heat.

6. A nuclear power plant according to claim 1, configurated so that plant capacity may be increased by addition of heat exchangers and associated blowers.

7. A nuclear power plant according to claim 1, further comprising:

an external circulation loop connected to said liner cooling means;

an elevated reservoir connected to said external cooling loop;

a recooling circulating loop connected to said reservoir; and an additional heat sink connected to said recooling circulating loop.

8. A nuclear power plant according to claim 7, further comprising:

means for introducing fluid to said liner cooling means connected to said external circulating loop.

* * * * *